(12) United States Patent
Singh et al.

(10) Patent No.: US 6,723,367 B2
(45) Date of Patent: Apr. 20, 2004

(54) PROCESS FOR PREPARING READY-TO-DRINK SHELF STABLE SUGARCANE JUICE BEVERAGE

(75) Inventors: Iboyaima Singh, Karnataka (IN); Nagarajarao Ramesh Mysore, Karnataka (IN); Babasaheb Bhaskarrao Borse, Karnataka (IN); Ramalakshmi Kulathooran, Karnataka (IN); Raghavan Bashyam, Karnataka (IN); Prakash Vishweshwaraiah, Karnataka (IN)

(73) Assignee: Council of Scientific and Industrial Research, New Delhi (IN)

( * ) Notice: Subject to any disclaimer, the term of this patent is extended or adjusted under 35 U.S.C. 154(b) by 62 days.

(21) Appl. No.: 10/108,419

(22) Filed: Mar. 29, 2002

(65) Prior Publication Data

US 2003/0185959 A1 Oct. 2, 2003

(51) Int. Cl.$^7$ .................................................. A23L 2/02
(52) U.S. Cl. ..................... 426/590; 426/658; 426/481; 127/46.1; 127/55; 127/30; 210/335
(58) Field of Search ................... 426/599, 590, 426/658; 127/55, 30, 46.1, 57; 210/335

(56) References Cited

U.S. PATENT DOCUMENTS

| | | | | |
|---|---|---|---|---|
| 3,994,743 A | * | 11/1976 | Paley | 127/48 |
| 4,063,960 A | * | 12/1977 | Paley | 127/42 |
| 4,083,732 A | * | 4/1978 | Paley | 127/48 |
| 4,784,859 A | * | 11/1988 | Lashley | 426/11 |
| 5,320,035 A | * | 6/1994 | Sanchez et al. | 100/345 |
| 6,068,869 A | * | 5/2000 | Bent et al. | 426/262 |
| 6,245,153 B1 | * | 6/2001 | Gonzales | 127/55 |
| 6,479,636 B1 | * | 11/2002 | Mirkov et al. | 530/379 |

FOREIGN PATENT DOCUMENTS

| | | |
|---|---|---|
| DE | 2 113 247 A2 | 8/1983 |
| FR | 2 776 304 A1 | 9/1999 |
| WO | WO 00/58525 A1 | 10/2000 |

OTHER PUBLICATIONS

S. Budavari, ed., 1996. The Merck Index, 12$^{th}$ edition, Merck & Co., Inc. Whitehouse Station, NJ., p. 1316.*

Vaillant F., et al., "Clarification and Concentration of Fruit Juices Using Membrane Techniques", Fruit Conservation and Processing: New Issues, New Techniques, pp. 1–2, Sep. 5, 2001, Publication No. XP–002222359, France.

Bhupinder K et al., "Studies on the Development and Storage Stability of Read–to–Serve Bottled Sugarcane Juice", International Journal of Tropical Agriculture, vol. 9, No. 2, pp. 128–134, Jun., 1991, Vidya International Publishers, Publication No. XP000866861, India.

Nielsen W K et al., "Prospects and Possibilities in Application of Membrane Filtration Systems Within the Beet and Cane Sugar Industry", Sugar Technology Reviews, vol. 9, No. 1, pp. 59–117, 1982, Publication No. XP–002143792, Amsterdam.

* cited by examiner

*Primary Examiner*—Carolyn Paden
(74) *Attorney, Agent, or Firm*—Burns, Doane, Swecker & Mathis, L.L.P.

(57) ABSTRACT

The present invention relates to an improved process for the preparation of ready-to-drink, shelf stable sugarcane juice beverage using a membrane-processing unit and subsequent pasteurization.

8 Claims, No Drawings

PROCESS FOR PREPARING READY-TO-DRINK SHELF STABLE SUGARCANE JUICE BEVERAGE

FIELD OF THE INVENTION

The present invention relates to an improved process for the preparation of ready-to-drink, shelf stable sugarcane juice beverage. The process, in particular, describes the method or preparation of juice using a membrane-processing unit and subsequent pasterurization.

BACKGROUND OF THE INVENTION

Sugarcane contains 18–20% solids and the juice obtained from it is a popular beverage. This natural product is reported to impart health benefits to the consumers. However, the major problem encountered is the lack of hygiene during crushing operation resulting in the contamination of the juice with a heavy load of micro-organisms which arises due to improper cleaning of the sugarcanes and handling of the finished product. Raw sugarcane juice is a carbohydrate-rich, low acid food and is therefore susceptible to the growth of molds and yeasts, of spoilage bacteria and also of pathogenic bacteria. Therefore, such freshly crushed juice cannot be preserved even for a few hours as it is known to ferment very quickly.

Several attempts have been made by many to develop a process for preserving sugarcane juice. Yet there is no knowledge/information regarding its manufacture and sale in any form of packaged material commercially. There is also no published information/patent available on processing of sugarcane juice using microfiltration employing membranes.

Processing and preservation of flavoured sugarcane juice was attempted in CFTRI (Shankaranarayana, M. L. Abraham, K. O. and Raghavan, B. CFTRI Annual Report, 1986-87, p.70) but with limited success. The drawback with the product was browning and formation of off-flavor not acceptable to consumers believed to be due to the low pasteurization temperature (70° C.) for longer duration (10 min).

Attempts have been made to clarify sugarcane juice for various applications. There are a few patents relating to the preparation of sugarcane juice for manufacture of sugar.

U.S. patent (Kwok Robert J, Lancrenon Xavier and Theoleyre Marc-Andre, U.S. Pat. No. 5,902,409, May 1999) and U.S. patent (Kwok Robert J, Lancrenon Xavier and Theoleyre Marc-Andre, U.S. Pat. No. 5,554,227, November 1993) disclose a process for the manufacture of crystallized sugar from an aqueous sugarcane juice. The main objective of the cited patents was to concentrate the sugarcane juice to give a crystal sugar and molasses and not to develop a process for ready-to-drink, shelf stable, sugarcane juice beverage.

U.S. patent (Hartmann Eduard, C H, U.S. Pat. No. 5,252,350, October 1993) discloses a process for clarifying liquids, particularly raw juice from grapes and berries or other fruits and vegetables by ultrafiltration (U/F) microfiltration (MF). However, the pretreatment procedure required for berries like grapes is different from that required for sugarcanes and the juice is not pasteurized after UF/MF clarification.

U.S. patent (Ferguson Robert R and Walker James B, U.S. Pat. No. 4,933,197, June 1990) discloses a process for preparing a storage stable clarified serum from food juice in two stages using ultrafiltration and micro filtration. In the first stage, flavour and aroma components are separated and in the second stage the microorganisms by using two different pore sizes of the membrane. The two streams are later remixed to obtain a flavour-rich and aroma-rich microorganism free juice. The drawback of this process is the adoption of two stages of membrane processing which increases the cost of production and the chances of post-process contamination during filling into containers.

OBJECTS OF THE INVENTION

The main object of the present invention is to provide an improved process for the preparation of ready-to-drink shelf stable sugarcane juice beverage.

Another object of the invention is to clarify the sugarcane juice using micro-filtration technique.

Yet another object of the invention is to incorporate a heteropolysaccharide in the clarified juice to provide a homogeneous beverage.

Another object of the invention is to provide a ginger flavoured clarified sugarcane juice in ready to drink shelf stable form.

SUMMARY OF THE INVENTION

The above and other objects of the invention are achieved by the process of the invention wherein or preparation of juice is done using a membrane-processing unit and subsequent pasterurization.

Accordingly the present invention provides a process for the preparing ready-to-drink shelf stable sugarcane juice beverage comprising:

a. soaking the cleaned canes in a tank containing potassium meta bi-sulphate at about 0.1% concentration and citric acid at about 0.01% concentration for a period of 2–4 h, b. washing the canes with plain water obtained from the above treatment and crushing the canes using a mechanical device to obtain the juice having 18–20° Brix.

c. diluting the juice to 14–16° Brix and adding an organic acid at a concentration of 0.1–0.5%, d. filtering the above juice using a microfiltration unit employing a ceramic membrane, e. filling the juice into any of the packaging material as stated above and pasteurizing the same to obtain a clarified shelf stable sugarcane juice beverage.

In one embodiment of the invention, the clarified sugarcane juice is homogenized using a heteropolysaccharide in a concentration of 0.01–0.10%.

In another embodiment of the invention, ginger oleoresin is incorporated in the clarified juice in a concentration in the range of 0.01–0.05%.

In another embodiment of the invention, filtration of the juice is carried out using a synthetic or natural membrane similar to ceramic membrane with a pore size of 0.2 $\mu$m.

In a further embodiment of the invention, the filtration is done at an operating transmembrane pressure of 1–10 bars.

In a further embodiment of the invention, the filtration of the juice is done at a temperature of 20–40° C.

In yet another embodiment of the invention, the clarified juice as obtained is packaged into material chosen from glass bottles, lacquered aluminium cans and double ply poly aluminium laminated standi tetrapacks and then pasteurized to increase the life of the juice.

In another embodiment of the present invention, the filtered juice is filled into sterile glass bottles and pasteurized for 1–3 minutes.

DETAILED DESCRIPTION OF THE INVENTION

The process of the invention relies primarily on a combination of ultrafiltration and pasteurization to achieve a ready to drink shelf table sugarcane juice. The process comprises soaking the cleaned canes in a tank containing potassium meta bisulphate at about 0.1% concentration and citric acid at about 0.01% concentration for a period of 2–4 h. The canes are then washed with plain water and crushed to obtain the juice having 18–20° Brix. The juice is then diluted to 14–16° Brix and an organic acid added at a concentration of 0.1–0.5%. The diluted juice is then filtered using a microfiltration unit employing a ceramic membrane and filled into packaging material and pasteurized to obtain a clarified shelf stable sugarcane juice beverage. A heteropolysaccharide additive can be added in a concentration of 0.01–0.10% to the clarified juice to impart body and mouthfeel to the beverage.

Any desired additional flavour such as ginger oleoresin can be added before pasteurization to impart additional flavour to the clarified juice. Such additional flavours are normally added in a concentration in the range of 0.01–0.05%.

Filtration of the juice is carried out using a synthetic or natural membrane similar to ceramic membrane with a pore size of 0.2 μm. The filtration is done at an operating transmembrane pressure of 1–10 bars. The temperature of the filtration step is preferably in the range of 20–40° C.

The clarified juice as obtained is packaged into material chosen from glass bottles, lacquered aluminium cans and double ply poly aluminium laminated standi tetrapacks and then pasteurized to increase the life of the juice. For example, the filtered juice is filled into sterile glass bottles and pasteurized for 1–3 minutes.

The process for the preparation of shelf stable sugarcane juice in bottles in illustrated in the following flow chart.

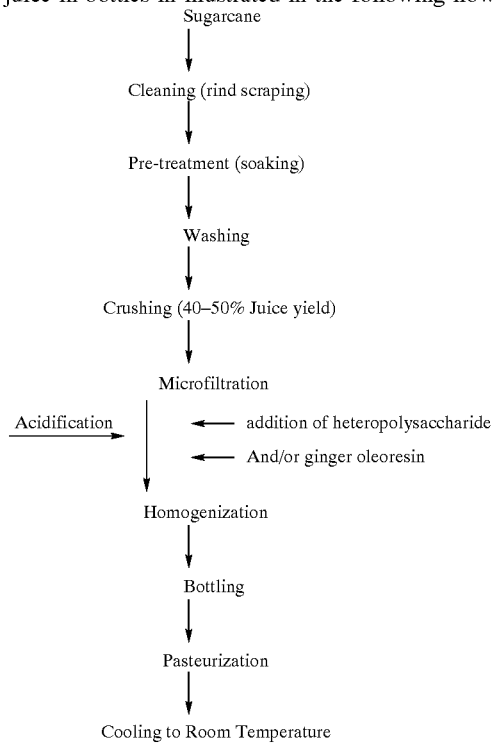

The novelty of the process lies in the combined manner in which critical steps such as pre-treatment of the sugarcanes, filtering the juice using microfiltration, followed by the homogenization with a heteropolysaccharide, adding ginger flavour and filling the juice into bottles or any other packaging materials and pasteurizing for a specified period to obtain a shelf stable sugarcane juice beverage. Microfiltration using membranes offers many advantages like low energy consumption, low operation cost, no thermal damage to heat sensitive aroma components, improved product quality and microbially safe product. Microfiltration of sugarcane juice resulted in increased juice clarity, better retention of flavour due to removal of suspended solids, colloidal materials, waxes and high molecular weight polysaccharides from the fresh juice without any chemical and heat treatment. However, addition of the heteropolysaccharide restored the much needed homogeneous cloudy appearance and mouth feel to the beverage, without affecting the flavour.

The following examples are given by way of illustration of the present invention and therefore should not be construed to limit the scope of the present invention.

EXAMPLE 1

75 kg sugarcanes were cleaned with water and the outer skin scraped manually with a knife. The scraped sugarcanes were soaked in 0.1% potassium metabisulphite solution mixed with 0.01% citric acid in 100L water for 2 hours. The canes were removed, drained off water, washed with fresh water and then crushed using a motorized crusher with three passes. About 30 liters of juice was collected. This juice was filtered using microfiltration unit [SCT P 1960, Techniques Industrielles Appliques, Bollene, France] equipped with a ceramic membrane of 0.2 um at an operating pressure of 2 bars, at a temperature of 29–30° C. and a mean permeate flux of 80+5 $kg/h/m^2$ for 60 minutes. It was mixed with 0.25% citric acid, filled into 200 mL capacity sterile glass bottles with a headspace of 10 mL, crowned and pasteurized at 95±2° C. for 2 min.

EXAMPLE 2

The clarified sugarcane juice was obtained as per the procedure described in Example—1. The juice was mixed with 0.25% citric acid and a heteropolysaccharide (0.05%) and homogenized. The prepared beverage was filled in sterile glass bottles as mentioned in Example 1 and pasteurized at a temperature of 95±2° C. for 3 min.

EXAMPLE 3

The clarified sugarcane juice was obtained as per the procedure described in Example—1. The juice was mixed with 0.25% citric acid, ginger oleoresin (0.017%) and homogenized with Tween 60. Subsequently, the juice was filled into 200 mL capacity sterile glass bottles with a headspace of 10 mL, crowned and pasteurized at 95±2° C. for 2 min.

We claim:

1. A process for the preparing ready-to-drink shelf stable sugarcane juice beverage comprising:
    a. soaking the cleaned sugar canes in a tank containing potassium meta bi-sulphate at about 0.1% concentration and citric acid at about 0.01% concentration for a period of 2–4 h;
    b. washing the canes with plain water and crushing the canes using a mechanical device to obtain the juice having 18–20° Brix.

c. diluting the juice to 14–16° Brix and adding an organic acid at a concentration of 0.1–0.5%, d. filtering the above juice using a microfiltration unit employing a ceramic membrane to form a clarified sugarcane juice, e. filling the juice into any of the packaging material as stated above and pasteurizing the same to obtain a clarified shelf stable sugarcane juice beverage.

2. A process as claimed in claim 1 further comprising homogenizing the sugarcane juice in the presence of a heteropolysaccharide in a concentration of 0.01–0.10%.

3. A process as claimed in claim 1 wherein ginger oleoresin is incorporated in the clarified juice in a concentration in the range of 0.01–0.05%.

4. A process as claimed in claim 1 wherein the filtration of the juice is carried out using a membrane with a pore size of 0.2 µm.

5. A process as claimed in claim 1 wherein the filtration is done at an operating transmembrane pressure of 1–10 bars.

6. A process as claimed in claim 1 wherein the filtration of the juice is done at a temperature of 20–40° C.

7. A process as claimed in claim 1 wherein the clarified juice as obtained is packaged into material chosen from glass bottles, lacquered aluminium cans and double ply poly aluminium laminated standi tetrapacks and then pasteurized to increase the life of the juice.

8. A process as claimed in claim 1 wherein the filtered juice is filled into sterile glass bottles and pasteurized for 1–3 minutes.

* * * * *